Inventor
Walter Rosenhaft
by Walter S. Bleston
ATTORNEY

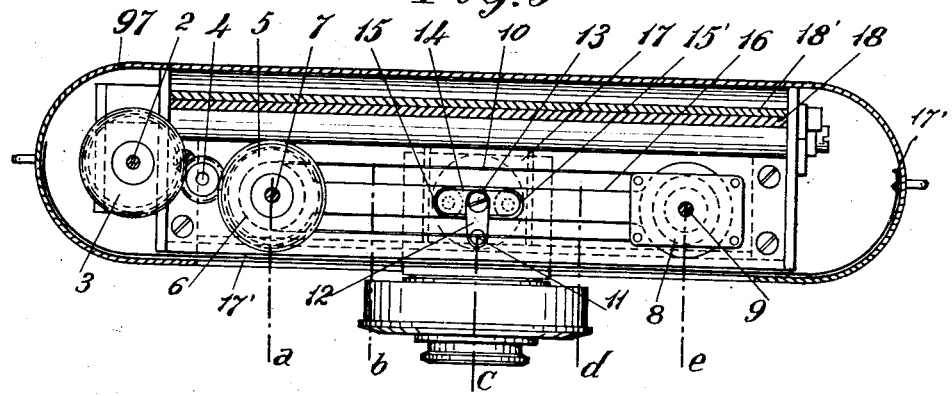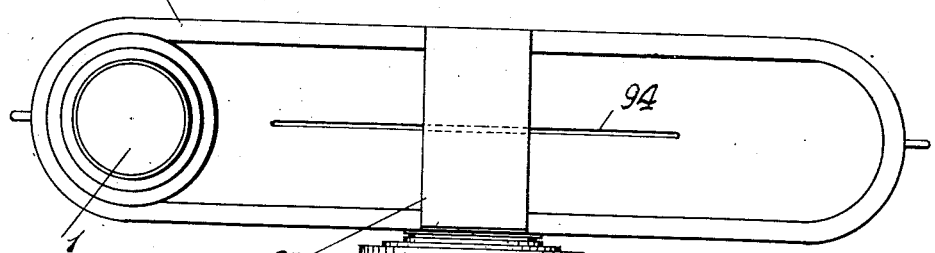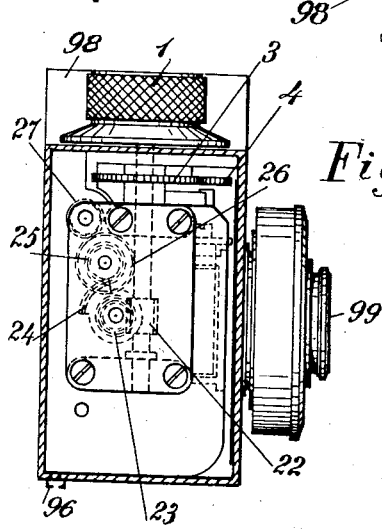

Oct. 14, 1941.　　　W. ROSENHAFT　　　2,259,084
HAND CAMERA FOR THE PRODUCTION THEREWITH OF
SMALL-SIZED PHOTOGRAPHS IN SERIES
Filed March 20, 1939　　　3 Sheets-Sheet 3
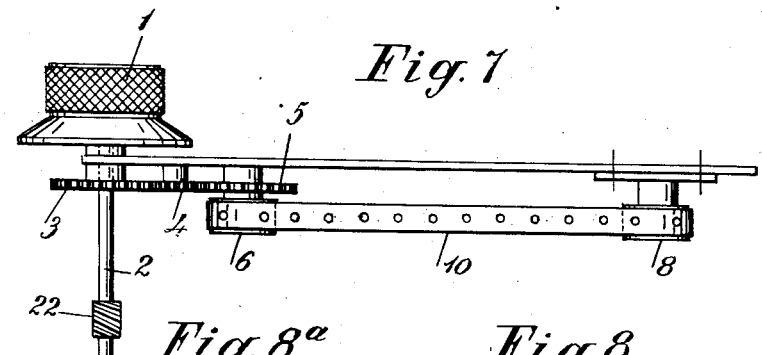
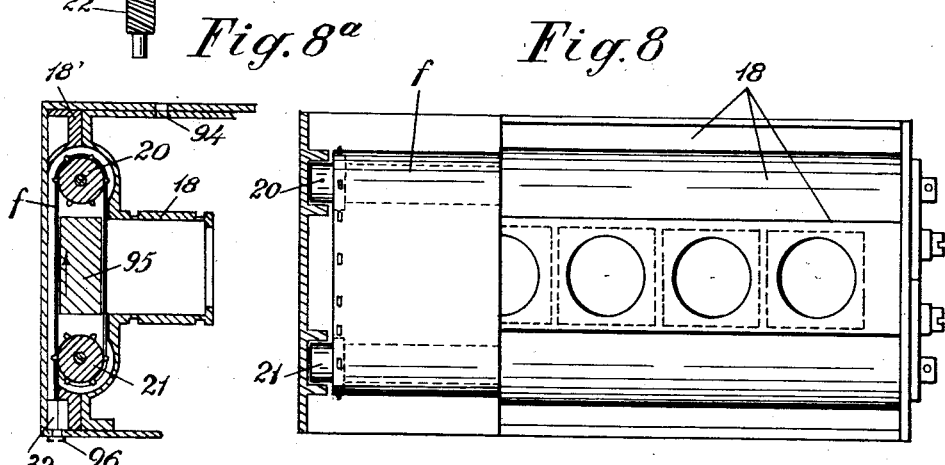
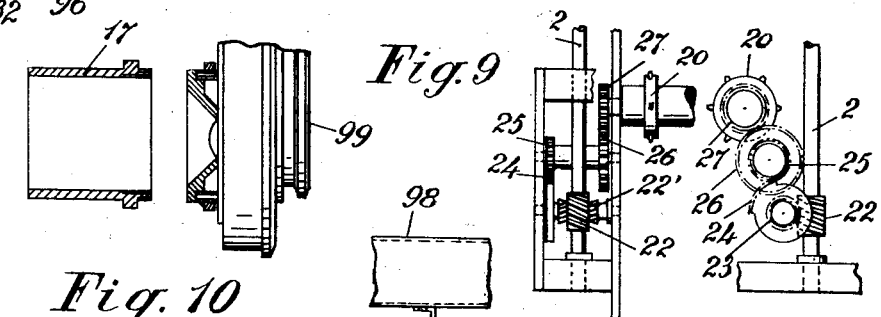
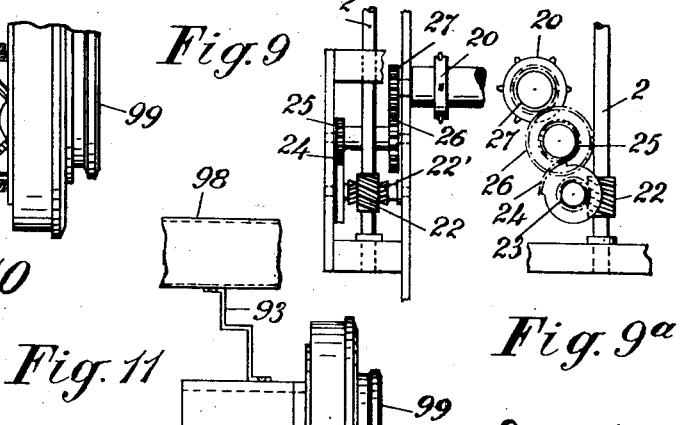
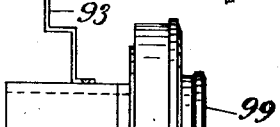
Inventor
Walter Rosenhaft
by Walter S. Bleston
ATTORNEY Patented Oct. 14, 1941

2,259,084

UNITED STATES PATENT OFFICE 2,259,084

HAND CAMERA FOR THE PRODUCTION THEREWITH OF SMALL-SIZED PHOTOGRAPHS IN SERIES

Walter Rosenhaft, Rome, Italy

Application March 20, 1939, Serial No. 262,866
In Italy March 28, 1938

2 Claims. (Cl. 95—37)

The cameras for the production of series of small-sized photographs arranged according to postage-stamp sheets in horizontal and vertical rows, have been built hitherto only as studio-cameras of great size because the well-known devices characteristic of that camera type and required to shift the lens and the sensitive layer relatively to each other are cumbersome and heavy, and, therefore, absolutely unsuitable for a hand-camera. For these reasons the amateur hitherto could not enjoy the great economy which may be obtained by taking small-sized photographs of said kind. It is the object of my invention to obviate this drawback by means of a new arrangement of the sensitive support in the camera, and by means of a new mechanism for the above mentioned relative displacements.

According to my invention, a flexible quadrangular perforated film-sheet is used as sensitive support, and in order to save space this film-sheet is introduced in the camera on an arched path, whereby the film is bent approximately on a horizontal middle line, so that in a vertical direction, it takes less than that or at least half the space required in a horizontal direction. The individual photographs of the horizontal rows of this film-sheet, bent on two rollers like an endless band, can be exposed owing to a horizontal shifting of the lens, whereas an intermittent vertical shift of the sensitive support in its guide brings the next horizontal row before the lens until all the rows are filled with photographs.

It is to be understood that the sensitive sheet may have the form of a square as well as of a rectangle and that it would be also possible to modify the structure of the camera so as to allow the use of a long roll-film as sensitive support.

A preferred form of my camera is shown in the accompanying drawings.

Fig. 3 is another inner view taken along line 3—3 of Fig. 2;

Fig. 4 is a vertical section taken along the line 4—4 of Fig. 2;

Fig. 5 is a horizontal section taken along the line 5—5 of Fig. 2;

Fig. 6 is a plan view of the camera;

Fig. 7 shows in detail the transport mechanism of the lens holder;

Figs. 8 and 8a show in front view and in section respectively the inner frame plate;

Figs. 9 and 9a show in side view and in front view respectively the film transport gearing;

Fig. 10 shows the separate parts of the lens holder; and

Fig. 11 shows diagrammatically the connection between the lens holder and the view-finder.

Figure 1:
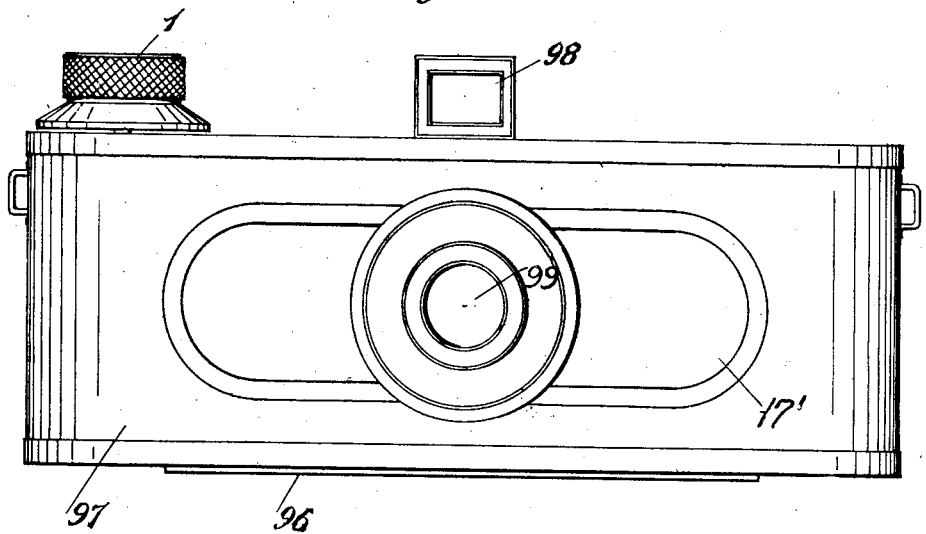
Fig. 1 shows a front view of the camera.

In the hand-camera shown in the figures a turning knob 1 on the top of the camera casing 97 transmits the rotary movement to a shaft 2 and to gear wheels 3, 4 and 5, the latter being integral with the sprocket wheel 6 and loose on the pivot 7. On the other side of the camera, in a symmetrical position with the sprocket wheel 6, a second sprocket wheel 8 is loosely rotatable on the pivot 9.

The sprocket wheels 6 and 8 are connected by a perforated metal band 10. A bolt 11 bearing a lever 12 is attached to the joint of said band. The distance between the center 13 of the bolt 12 is exactly equal to the radius of the sprocket wheels 6 and 8. To the lever 12 a small block 14 is fixed, bearing on the two ends loosely mounted rollers 15 and 15' which are free to slide within a guide 16.

The pin 13 constituting a pivot for lever 12 is fixed to the slidable lens holder 17 which is guided by four ball guides 19 within an inner frame plate 18. Sprocket wheel 6, when turned in the aforesaid manner by means of the knob 1, moves the band 10, the bolt 11, the lever 12 and the lens holder 17.

Figure 2:
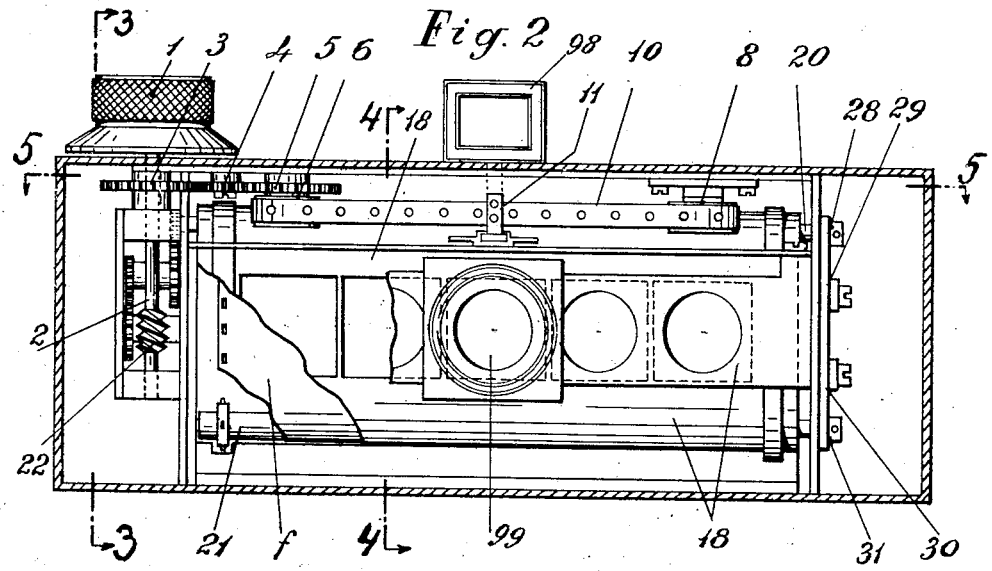
Fig. 2 is an inner view thereof, partly in section.

The sprocket wheels 6 and 8 have such a diameter that the stroke of the lens system or objective 99 from one to the other photograph exactly corresponds to half the periphery (180°) of these wheels. The distance between the centers of rotation 7 and 9 must be equal to the gauge of the frame or of the photographs multiplied by their number in a horizontal row of the sensitive support. Therefore the axes of the shafts 7 and 9 are coincident with the middle lines of the first and of the last photograph (see Fig. 2). Thus in the camera here shown, the objective may occupy five different positions $a$, $b$, $c$, $d$, $e$ (see Fig. 5). A view finder 98 may be connected with the lens holder by suitable means as indicated at 93 and movable in a slot 94.

If it is assumed that the parts are originally in the position $a$, then by rotating the knob 1 the lens will pass from the one to the other position until the position $e$ is reached. Each frame gauge or pitch corresponds to a 180° rotation of the knob. When the lens has reached its position $e$ the movement is stopped, and the bolt 11 with the lever 12 is exactly in line with the pivot 9, the latter being coincident with the lever axis 13. If the knob 1 is turned further in the same sense, the band 10 will rotate the lever 12 by 180° about the axis 13.

During this movement the objective remains in its position e, whereas the sensitive support makes a step in the vertical direction, by a stroke which corresponds to the distance between two horizontal rows of photographs.

If the user continues to turn knob 1, the lens-holder begins its return movement until it reaches the starting point, and so on.

The means for moving the sensitive support f (Fig. 4) essentially consists of two rollers 20 and 21 having sprockets engaging with perforations of the film in order to ensure its correct feeding.

The roller 20 receives its movement from the knob 1 and from its shaft 2 by means of a gearing formed by the worm 22, the wheel 23, the toothed segment 24, the pinion 25, the wheel 26 and the pinion 27 integral with the roller 20. The upper roller 20 is further connected with the lower roller 21 by means of the gear wheels 28, 29, 30, 31.

The toothed segment 24 is so designed that its teeth cover an arc of $360/5=72°$. By means of the worm 22 and the wheel 23 the toothed segment turns once for each 2.5 rotations of the knob 1. The toothed segment 24 is engaging the pinion 25 exactly when the lens holder reaches one of the end positions. The gear-rings 22, 23, 24, 25, 26, 27, and the diameter of the roller 20 are so dimensioned that a rotation of 180° of the knob 1 corresponds exactly to the movement from one to the next row of photographs. In this manner the sensitive support is moved always at the time when the lens-holder, having reached its end position, is stationary.

For the introduction of the sensitive support in the camera there is provided a slot 96 and a velvet trap 32 or the like, with which a magazine containing the non-exposed films or a magazine receiving the exposed films may be connected. A feeding device forming a part of the magazine will forward the end of the film until the perforations are engaged by the sprocket wheel 21, a block 95 serving to space the exposed from the non-exposed portion of the film. By turning the knob 1, the rollers 20 and 21 will bring the film in the position for starting the exposure of the first row of photographs.

After the last exposure the knob 1 is turned in the opposite sense, so as to discharge the exposed film.

What I claim is:

1. A hand-camera for producing series of small-sized photographs, arranged in horizontal rows and vertical lines on a sensitive support by using a horizontally movable lens and a vertically movable quadrangular sensitive support, comprising means for the alternating horizontal movements of the lens holder, means for the periodical vertical movement of the sensitive support, means for suspending the horizontal movements of the lens holder during the vertical movement of the sensitive support, means for the exposure of the single fields of the sensitive support while protecting the other fields, light-tight means for the introduction and the discharge of the sensitive support and guide means for bending the sensitive support by 180° approximately on a horizontal middle line of the said support.

2. A hand-camera for producing series of small-sized photographs, arranged in horizontal rows and vertical lines on a sensitive support by using a horizontally movable lens and a vertically movable quadrangular sensitive support, comprising means for the alternating horizontal movements of the lens holder, means for the periodical vertical movement of the sensitive support, means for suspending the horizontal movements of the lens holder during the vertical movement of the sensitive support, means for the exposure of the single fields of the sensitive support while protecting the other fields, light-tight means for the introduction and the discharge of the sensitive support and guide means for bending the sensitive support by 180° approximately on a horizontal middle line of the said support, all these means being moved by a single knob.

WALTER ROSENHAFT.